United States Patent

Takano et al.

[11] Patent Number: 5,945,011
[45] Date of Patent: Aug. 31, 1999

[54] CONTROL APPARATUS FOR WELDING ROBOT AND METHOD OF TEACHING WELDING ROBOT

[75] Inventors: Fumitomo Takano; Hitoshi Saito; Hiroki Hashimoto; Toshiaki Nagasawa; Tetsuya Ozawa, all of Saitama-ken, Japan

[73] Assignee: Honda Giken Kogyo Kabushiki Kaisha, Tokyo, Japan

[21] Appl. No.: 08/889,581

[22] Filed: Jul. 8, 1997

[30] Foreign Application Priority Data

| Jul. 10, 1996 | [JP] | Japan | 8-180283 |
| Jul. 17, 1996 | [JP] | Japan | 8-187253 |
| Oct. 8, 1996 | [JP] | Japan | 8-267517 |

[51] Int. Cl.$^6$ .................................................. B23K 11/24
[52] U.S. Cl. ........................... 219/108; 219/86.7; 901/42
[58] Field of Search ................................. 219/108, 110, 219/86.7, 86.25, 86.51; 901/42

[56] References Cited

U.S. PATENT DOCUMENTS

| 4,841,113 | 6/1989 | Hamada et al. | 219/110 |
| 5,321,225 | 6/1994 | Boyer | 219/89 |
| 5,340,960 | 8/1994 | Takasaki et al. | 219/86.7 |
| 5,405,075 | 4/1995 | Narita et al. | 228/102 |
| 5,449,875 | 9/1995 | Ito et al. | 219/86.7 |
| 5,484,975 | 1/1996 | Itatsu | 219/86.7 |
| 5,582,747 | 12/1996 | Sakai et al. | 901/42 |
| 5,652,488 | 7/1997 | Rennau | 219/86.51 |
| 5,714,733 | 2/1998 | Moro | 219/108 |
| 5,742,022 | 4/1998 | Crawford et al. | 219/86.25 |

FOREIGN PATENT DOCUMENTS

| 3-28265/1991 | 8/1985 | Japan . |
| 5-33968 | 5/1993 | Japan . |
| 5-204422 | 8/1993 | Japan . |
| 5-261560 | 10/1993 | Japan . |

Primary Examiner—Clifford C. Shaw
Attorney, Agent, or Firm—Armstrong, Westerman, Hattori, McLeland & Naughton

[57] ABSTRACT

A control apparatus for a welding robot has a welding gun which is provided at a front end of a robot arm to be driven by plural kinds of servomotors. An amplifier circuit board is provided so as to mount thereon appropriate inverters by selecting out of those corresponding to respective kinds of servomotors and an inverter for the welding gun. A servo software corresponding to each of the inverters is called out of a memory device by discriminating the kind of each of the inverters. In a method of teaching the welding robot in which the welding gun is opened and closed by a servomotor, plural kinds of opening and closing patterns of the welding gun are set in advance. An appropriate opening and closing pattern is selected out of the plural kinds of opening and closing patterns in accordance with the motion of the robot arm, and the selected pattern is made the teaching data relating to the opening and closing of the welding gun.

15 Claims, 7 Drawing Sheets

CONTROL APPARATUS FOR WELDING ROBOT AND METHOD OF TEACHING WELDING ROBOT

BACKGROUND OF THE INVENTION

1. Field of the Invention

The present invention relates to a control apparatus for a welding robot which is provided with a welding gun at a front end of a robot arm, and also relates to a method of teaching a welding robot.

2. Description of the Related Art

As this kind of conventional control apparatus for a welding robot, there has hitherto been known the following one, e.g., in Japanese Published Examined Patent Application No. 28265/1991. Namely, in a control apparatus for a welding robot, which is provided with a welding transformer and a welding gun at a front end of a robot arm, a welding inverter apparatus, which supplies the transformer with electric power and a driving control apparatus, which controls driving servomotors for the welding robot, are contained in a single casing so as to constitute a single control apparatus.

The construction of the above-described driving control apparatus is known, e.g., in Published Unexamined Japanese Patent Application No. 204422/1993. Namely, circuit boards for amplifiers (i.e., amplifier circuit boards), each being called a servo controller, for controlling servomotors having three axes, are connected depending on the number of axes of the welding robot. For example, in case the welding robot has five axes, two amplifier circuit boards are connected in parallel with each other. As shown in FIG. 10, inside one amplifier circuit board 1A, there are provided PWM (pulse width modulating) generators 11, 12, 13, which output corresponding PWM signals to respective servomotors M, to be controlled by the amplifier circuit board 1A, and inverters 21, 22, 23, which supply each of the servomotors M with three-phase electric current, based on the PWM signals from the PWM generators 11, 12, 13. Among the electric currents to be supplied from each of the inverters 21, 22, 23 to the servomotors M, the electric currents of U phase and V phase are detected by electric current sensors and are inputted to a multiplexer 3. In the multiplexer 3, the electric current signals of U phase and V phase are sequentially switched, with respect to the servomotors M; and are outputted to A/D converters 41, 42. The supply electric current to each of the servomotors M is thus feedback-controlled (i.e, controlled by way of feedback). To a rotary shaft of the servomotors M, there is connected a pulse generator PG, which outputs a signal corresponding to the rotational speed of the servomotor M. The rotational speed signals to be outputted from the pulse generators PG are captured via interfaces 51, 52, 53 to thereby feedback-control the rotational speeds of the servomotors M.

Each of the servomotors M varies in output characteristics, depending on which portion of the robot it is mounted. For example, in case the transformer for the welding gun, is supplied with electric power via an inverter, the characteristics of the transformer and the characteristics of each of the servomotors are completely different from each other. Since the inverters 21, 22, 23 must be set in accordance with respective characteristics, inverters 21, 22, 23 must be respectively prepared for exclusive uses to suit the characteristics of each of the servomotors M and the characteristics of the transformer that are connected.

In the above-described conventional apparatus, the inverters 21, 22, 23 are for exclusive use to suit the servomotors M and the transformer to which the inverters 21, 22, 23 are connected. Therefore, the amplifier circuit boards 1A become specific (or exclusive) and must be manufactured for each combination of loads to be connected to each of the inverters 21, 22, 23.

It may be considered to detachably mount the inverters. If this is done it becomes necessary to build in servo software which corresponds to each of the inverters, resulting in built in man-hours for building in the servo software. Further, there is a possibility that a wrong servo software may be built in, by mistake at the time of building in the servo software.

Further, in the above-described conventional control apparatus, as described in Japanese Published Examined Patent Application No. 28265/1991, the welding inverter apparatus and the driving control apparatus are contained in a single casing. However, the welding inverter apparatus and the driving control apparatus are constituted into separate bodies. Therefore, there are disadvantages in that the casing becomes large and that there is a limit to freedom in layout of the welding apparatus. Further, since the welding inverter apparatus and the driving control apparatus are constituted into separate bodies, in performing the teaching operations for the welding robot, the teaching for the welding inverter apparatus and the teaching for the driving control apparatus must be separately performed. Therefore the teaching work becomes troublesome.

An explanation will now be made about the conventional method of teaching the welding robot.

For example, in Japanese Published Unexamined Utility Model Registration Application No. 33968/1993 and in Japanese Published Unexamined Patent Application No. 261560/1993, there is shown a conventional method of teaching its welding robot in which the opening and closing of the welding gun is performed by a servomotor. The opening and closing of the conventional welding gun is servo-controlled by a control apparatus which controls the motion of the robot arm in a similar manner as a servomotor of each axis which drives the robot arm. Therefore, in performing the teaching operation of the welding robot, the teaching for the motion of the robot arm and the teaching for the opening and closing of the welding gun must be performed seperately.

For example, when welding is carried out at a welding point X (hereinafter simply called X) and then at a next welding point Y (hereinafter simply called Y) by moving the welding gun to Y, teaching is performed at X and Y for the motion of the robot arm, and further teaching is further performed for the opening and closing of the welding gun at a point (a point of completion of opening of the welding gun) which is away from X by a predetermined distance and at a point of starting the closing of the welding gun which is before Y by a predetermined distance.

In the above-described conventional method of teaching, if it relates only to the motion of the robot arm, the teaching at X and Y will be sufficient, with the distance between X and Y being interpolated. Therefore, if the teaching for the opening and closing of the welding guns is not performed, the robot arm will move from X to Y without stopping inbetween. In order to perform the teaching for the opening and closing of the welding gun at the above-described two points, these two points also become the teaching points for the robot arm which is to be synchronized with the opening and closing of the welding gun. Therefore, the robot arm will have to perform unnecessary deceleration and acceleration at these two teaching points while it moves from X to Y, resulting in a poor teaching efficiency.

SUMMARY OF THE INVENTION

According to the present invention relating to the control apparatus, there is provided a control apparatus for a welding robot comprising a welding gun provided at a front end of a robot arm and which is driven by plural kinds of servomotors, characterized in: that an amplifier circuit board is provided so as to mount thereon appropriate inverters by selecting out of those corresponding to respective kinds of servomotors and an inverter for the welding gun; and that a servo software corresponding to each of the inverters is called out of a memory device by designating the kind of each of the inverters.

By making arrangement such that the kind of the inverter is designated by a servo amplifier and that the servo software is selected, based on the result of such designation a plurality of servo amplifiers can properly be mounted on the amplifier circuit board, depending on the kinds of the servomotors, or the like. Therefore, man-hours for separately building in the servo software become needless, and a mistake in building in the servo software is avoided.

If each of the inverters is provided with a setting portion for setting a code corresponding to each kind of the inverters, the code in the setting portion can be read out from the amplifier circuit board to thereby specify the kind of the inverter.

According to another invention relating to the control apparatus, there is provided a control apparatus for a welding robot comprising a welding gun which is provided at a front end of a robot arm, characterized in that control of servomotors which drive the robot arm and control of welding electric current to be supplied to the welding gun are performed by a same amplifier.

The amplifier for controlling the motion of the welding robot is provided with inverters for supplying the servomotors with electric current. If a part of these inverters is replaced by an inverter to be used for controlling the welding electric current, the control of the motion of the welding robot and the control of the welding electric current can be performed by a single amplifier. By employing the above arrangement, the entire control apparatus can be made small in size and the teaching work can be performed easily.

The sampling period of the welding electric current is determined by the frequency of the alternating current to be supplied to a welding transformer. The sampling period to detect the driving electric currents to the servomotors, on the other hand, is determined by the characteristics of the servomotors. If the sampling period is too long, the characteristics of the servomotors cannot be fully utilized. If the sampling period is too short, the operating processing (or computing operation) can no longer be performed. The sampling period of the driving electric currents for the servomotors is generally shorter than the sampling period of the welding electric current. Therefore, it becomes necessary to set the sampling period of the driving electric currents for the servomotors shorter than the sampling period of the welding electric current. On the other hand, in order to perform the control of the welding electric current and the control of the driving electric current of the servomotors by a single amplifier, the sampling periods of both cannot be freely set respectively. If the sampling period of the driving electric current of the servomotor is set to a value which is obtained by dividing the sampling period of the welding electric current by an integer, e.g., by an integer of 2, the driving electric current of the servomotors may be sampled at each period and the welding electric current may be sampled every other time (i.e., once in two times). However, the sampling period of the servomotors cannot be made longer than a predetermined period in order to fully utilize the characteristics of the servomotors. Further, if the sampling period is made shorter, the number of operating processing in the control apparatus increases, and there is a limit to the computing capacity of the control apparatus. Therefore, the sampling period of the driving electric current of the servomotors must be set so that it falls within a range of both sampling periods.

According to the present invention relating to the method of teaching, there is provided a method of teaching a welding robot comprising a welding gun mounted on a robot arm. The welding gun is opened and closed by a servomotor. The method comprises: setting in advance plural kinds of opening and closing patterns of the welding gun; and aside from teaching relating to a motion of the robot arm, selecting an appropriate opening and closing pattern out of the plural kinds of opening and closing patterns in accordance with the motion of the robot arm to make the selected pattern as teaching data relating to the opening and closing of the welding gun.

Since the teaching of opening and closing of the welding gun is performed by applying the opening and closing patterns that have been set in advance, aside from the teaching relating to the motion of the robot arm, the motion of the robot arm at the time of teaching is not affected by the opening and closing operation of the welding gun, with the result that the teaching efficiency can be improved.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
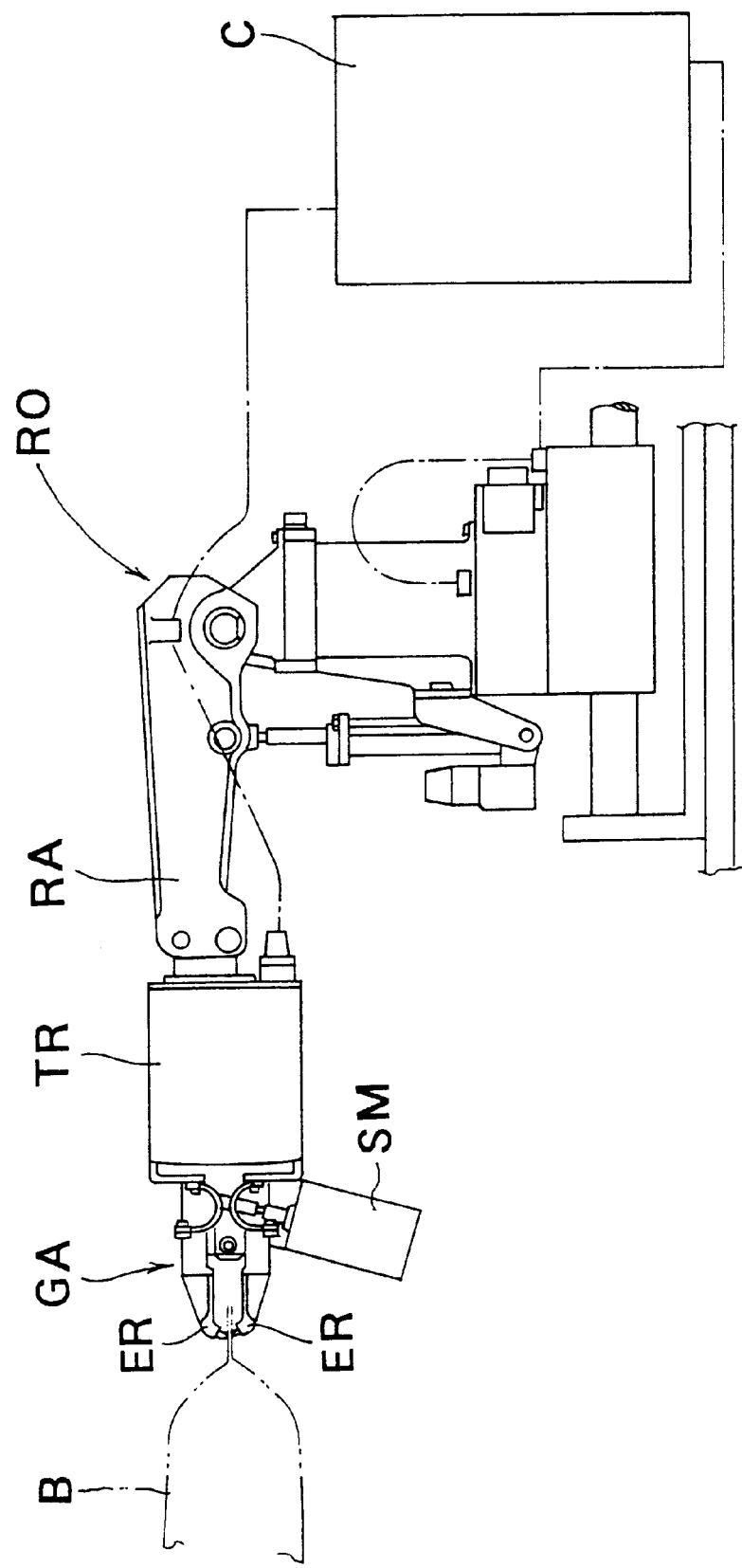
FIG. 1 is a view showing a general arrangement of a welding robot for use in the invention.

FIG. 1 shows a welding robot RO which, in the present embodiment, is used for spot-welding a vehicle body B of a motor vehicle. In the present embodiment, a 5-axis control robot equipped with five servomotors is used. At a front end of a robot arm there is mounted a welding gun GA via a welding transformer TR. The posture of the welding robot RO can be freely changed by controlling each of the servomotors with a control apparatus C. Once the posture of the welding robot RO is controlled and the welding gun GA is moved to a desired welding position of the vehicle body B, the vehicle body B is pinched by electrodes ER of the welding gun GA to thereby perform the spot welding. The opening and closing operation of the welding gun GA is performed by a servomotor SM in the same way as the posture control of the robot arm RA. During this operation, the transformer TR is being supplied with a welding alternating current of a predetermined frequency f from the control apparatus C. The nearer the servomotor is to the front end of the robot arm, the smaller becomes the load to be applied to the servomotor. The further the servomotor is away from the front end of the robot arm, the larger becomes the load to be applied to the servomotor.

Figure 2:
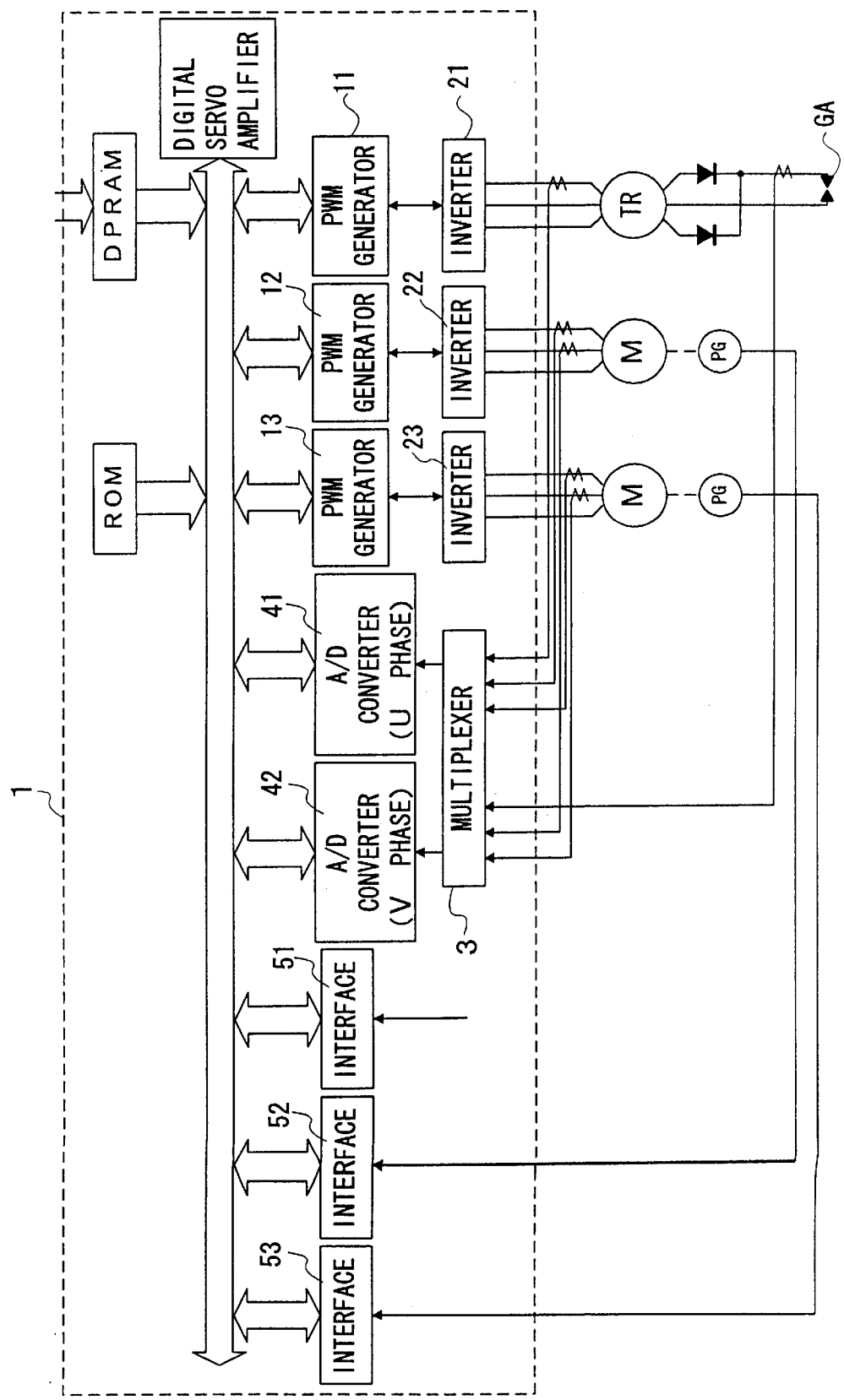
FIG. 2 is a block diagram showing an amplifier circuit board to be used in a control apparatus of the present invention.
Figure 10:
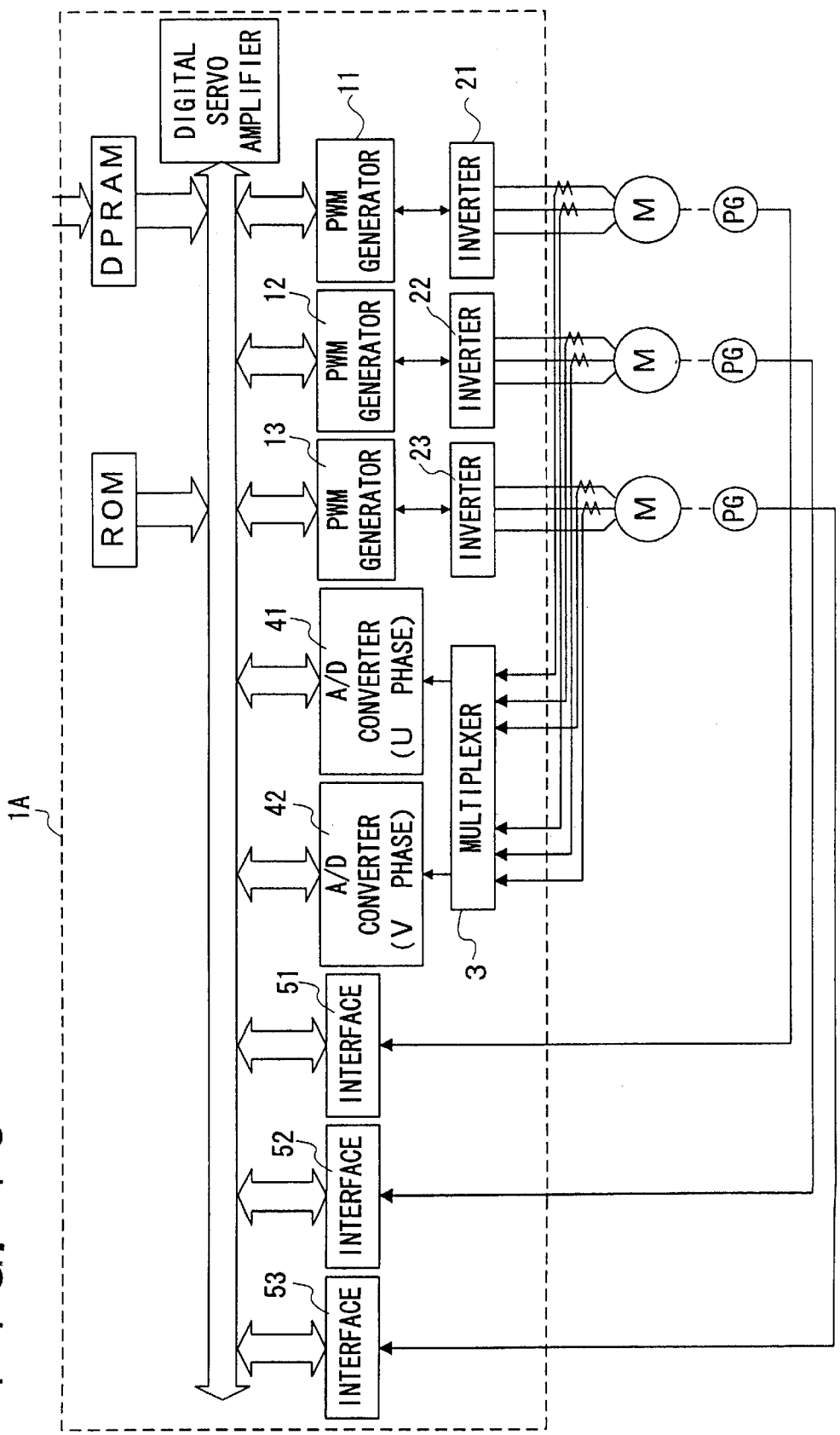
FIG. 10 is a block diagram showing the arrangement of a conventional amplifier circuit board.

The control apparatus C has built therein an amplifier 1A, as shown in FIG. 10. This amplifier 1A controls the operations of three servomotors out of the servomotors for the five axes of the welding robot RO. The control of the servomotors for the remaining two axes is performed by an amplifier 1 which is shown in FIG. 2. Both amplifiers 1 and 1A are connected in parallel with each other inside the control apparatus C. The same amplifier as the amplifier 1A is used as the amplifier 1 shown in FIG. 2, but the amplifier 1 differs from the amplifier 1A in that the welding electric current is supplied to the transformer TR via an inverter 21. Further, in order to detect the driving electric currents to the servomotors M, it is necessary to detect the electric currents of U phase and V phase among the three-phase electric currents. However, since the welding electric current is of a single-phase, it is enough to detect the electric current in only one side of the two electric cables on the side of the primary electric current to be connected to the transformer TR. Also on the side of the secondary electric current, the electric current of one side of two electric cables to be connected to the welding gun GA is detected and is inputted to a multiplexer 3. It may also be so arranged that only one of the primary electric current and the secondary electric current is detected. Further, since there is no need of providing the transformer TR with a pulse generator PG, an interface 51 is left unconnected. The interface 51 need not be provided at all in the amplifier 1. However, since the amplifiers of the same construction are commonly used as the amplifier 1 and the amplifier 1A in the present embodiment, the interface 51 remains therein in an unconnected condition.

Figure 3:
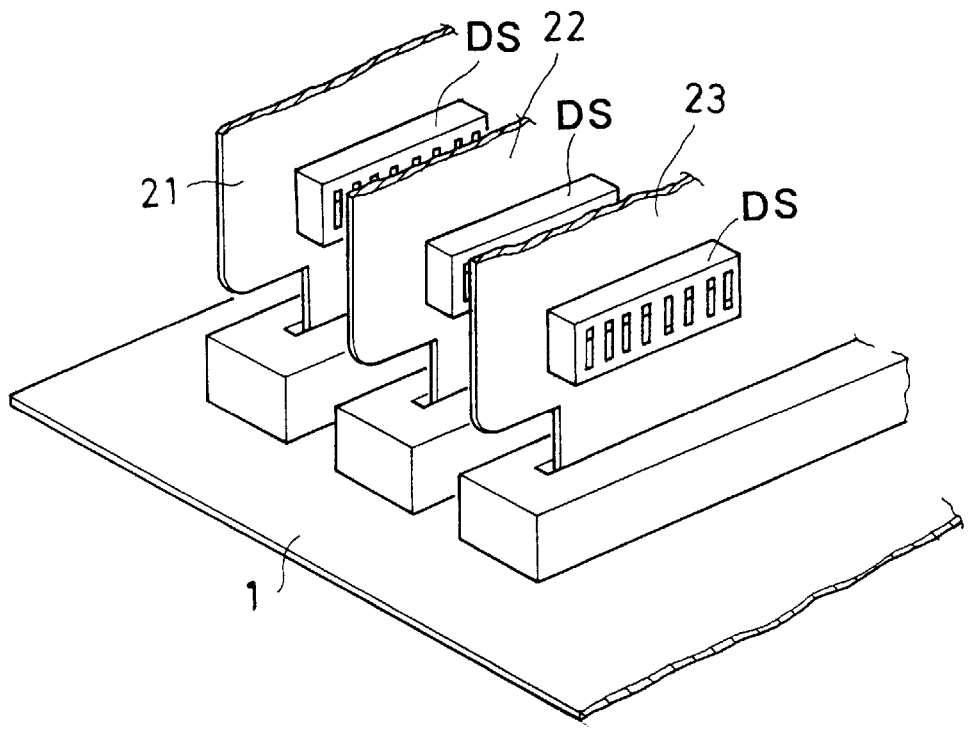
FIG. 3 is a perspective view of one example to show how DIP switchpacks are mounted relative to inverters.

AS shown in FIG. 3, each of the inverters 21, 22, 23 is provided with a DIP (dual inline package) switchpack (or a DIP switch assembly) DS. In case the characteristics of the servomotor M connected to the inverter 22 are different from the characteristics of the servomotor M connected to the inverter 23, respective DIP switchpacks DS are set to suit (or to deal with) the respective characteristics. Regarding the inverter 21 to which the transformer TR is connected, the DIP switchpack DS to be provided in the inverter 21 is set to suit the characteristics of the transformer TR.

When the control apparatus C is switched on, a circuit board of the amplifier (also called an amplifier circuit board) 1 receives information from a higher control portion (not illustrated) via DPRAM (dual port random access memory) about the characteristics of the servomotor M and the presence or absence of the connection of the transformer TR. On the other hand, a code which is set in the DIP switchpack DS of each of the inverters 21, 22, 23 is read out via a PWM (pulse width modulating) generator 11, 12, 13 to which is connected the respective inverters 21, 22, 23. Then, a comparison is made between the information read from the higher control portion and the code read from each of the inverters 21, 22, 23. If both coincide with each other, a servo software corresponding to each of the codes is called up from a ROM (read-only memory), and also a signal meaning that the preparations have been finished is sent to the higher control portion. Then, in accordance with a control signal from the higher control portion, each of the servomotors is driven and the transformer TR is supplied with welding electric power. If the information read from the higher control portion does not coincide with the code that is read from each of the inverters 21, 22, 23, an error signal is sent to the higher control portion and further control operation is stopped.

As an alternative, the following arrangement may also be employed. Namely, regarding the servomotors M, the data relating to their capacities are separated from the other data on the characteristics, and the data on the capacities are contained in the servomotors M themselves. The code set in the DIP switchpack DS of each of the inverters 21, 22, 23 and the data on the capacity from each of the servomotors M together are then compared with the information read from the higher control portion. The connection between the inverters 21, 22, 23 and the PWM generators 11, 12, 13 may be either in series connection or in parallel connection.

In order to sample the welding electric current to be supplied to the transformer TR, it is necessary to sample it at the peak of the welding electric current that is of a single phase. It follows that the sampling period of the welding electric current varies with the frequency of the welding electric current. Since the secondary electric current is full-wave-rectified, it may be sampled at the same period as the sampling period of the primary electric current.

Figure 4:
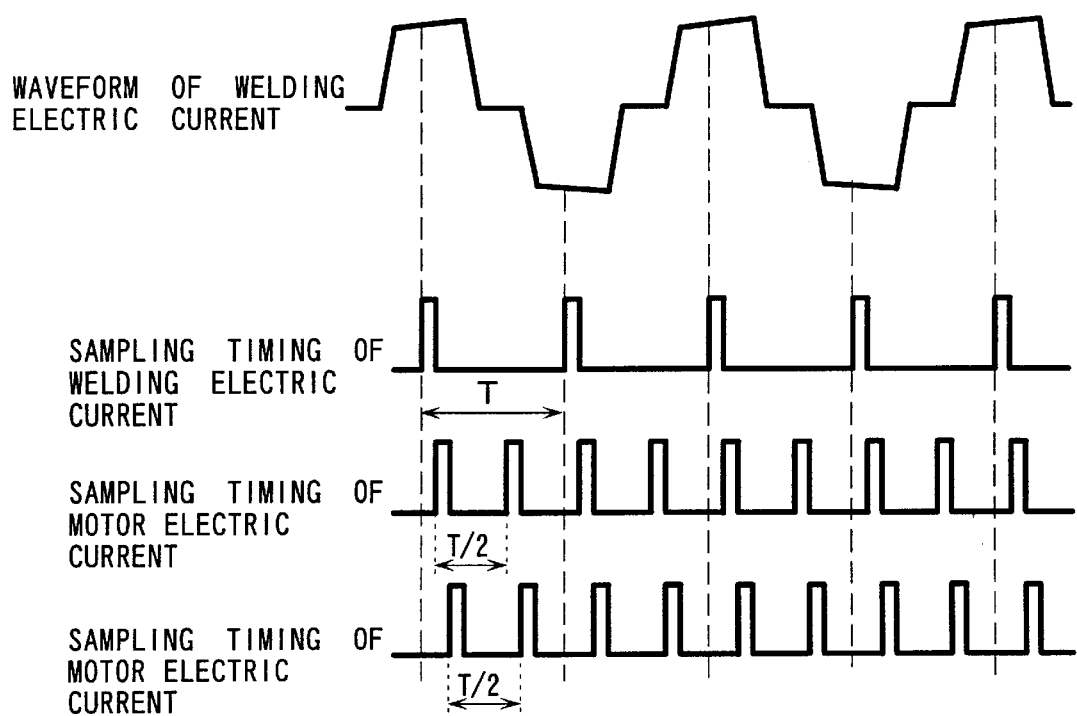
FIG. 4 is a diagram showing the relationship between the sampling period of the welding electric current and the sampling period of the electric motor current.

With reference to FIG. 4 and Table 1 given below, the sampling period T ($\mu$sec) of the welding electric current is unambiguously determined by the frequency f (Hz) of the welding electric current.

On the other hand, if the servomotor M corresponds to 5 kw, for example, the performance equivalent to 5 kw cannot be derived (or obtained) therefrom unless the electric currents of U phase and V phase are sampled at a sampling period shorter than 150 $\mu$sec. Further, in the present embodiment, if the sampling period becomes shorter than 100 $\mu$sec, the operational processing can no longer be made. Therefore, when the sampled data are converted by the multiplexer 3 for taking them into A/D converters 41, 42, the sampling data are taken in at a sampling period of T/2 relative to the sampling period T of the welding electric current, and the sampling data of the welding electric current that are taken in are neglected at a rate of once in two times. Then, the welding electric current can be sampled at a period of T, and the electric motor current can be sampled at a period of T/2. In case the period T/2 is found to be still too long, the electric motor current may be sampled at a period of T/4 which is further half the period of T/2 or at a period of T/8 which is again further half the period of T/4.

TABLE 1

| Sampling Period of Welding Electric Current | | Sampling Period of Electric Motor Current | | |
|---|---|---|---|---|
| f | T | T/2 | T/4 | T/8 |
| 800 | 625.0 | 312.5 | 156.3 | 78.1 |
| 900 | 555.6 | 277.8 | 138.9 | 69.4 |
| 1000 | 500.0 | 250.0 | 125.0 | 62.5 |
| 1100 | 454.5 | 227.3 | 113.6 | 56.8 |
| 1200 | 416.7 | 208.3 | 104.2 | 52.1 |
| 1300 | 384.6 | 192.3 | 96.2 | 48.1 |
| 1400 | 357.1 | 178.6 | 89.3 | 44.6 |
| 1500 | 333.3 | 166.7 | 83.3 | 41.7 |
| 1600 | 312.5 | 156.3 | 78.1 | 39.1 |
| 1700 | 294.1 | 147.1 | 73.5 | 36.8 |
| 1800 | 277.8 | 138.9 | 69.4 | 34.7 |
| 1900 | 263.2 | 131.6 | 65.8 | 32.9 |
| 2000 | 250.0 | 125.0 | 62.5 | 31.3 |

From Table 1, it can be seen that, when the electric motor current is sampled at a period of T/2, the frequency f of the welding electric current may be within a range of 1700 Hz through 2000 Hz. When the electric motor current is sampled at a period of T/4, it can be seen that the frequency f of the welding electric current may be within a range of 900 Hz through 1200 Hz. In the present embodiment, it can be seen that the sampling period of the electric motor current becomes too short to be practiced when the sampling is made at a period of T/8.

In the above-described embodiment, the sampling period of the electric motor current was set to $½^n$ multiplied by the sampling period T of the welding electric current. It may, however, be set to ⅓ or other integer fractions.

Next, an explanation will now be made about the method of teaching.

Figure 5:
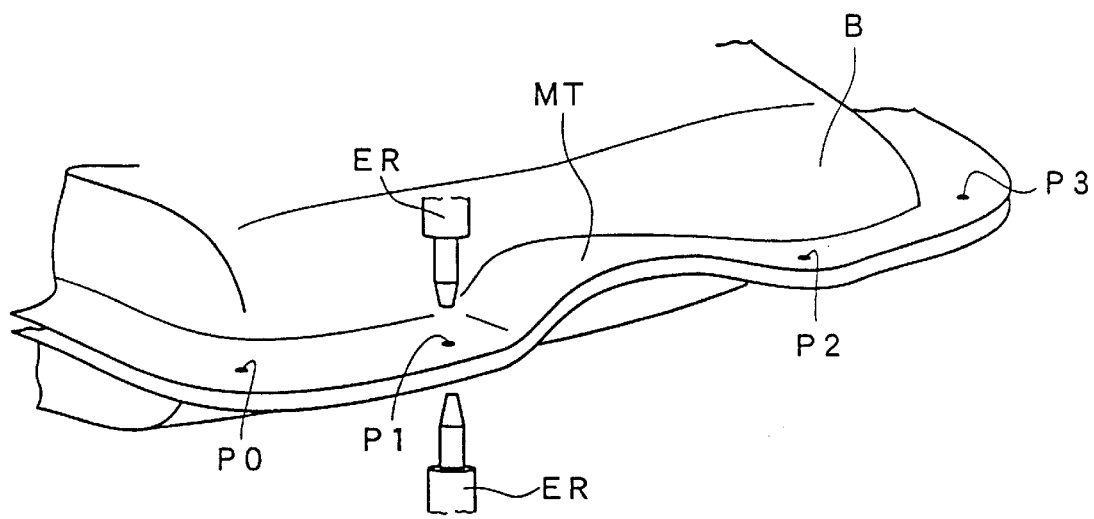
FIG. 5 is a perspective view showing the shape around welding positions of a vehicle body.

The welding positions are set in a large number on the vehicle body B. The welding is performed by sequentially moving the welding gun GA to each of these welding positions. Before starting the welding of the vehicle body B, it is necessary to perform teaching in advance. The teaching must be performed in two kinds, one in relation to the posture of the robot arm RA and the other in relation to the opening and closing of the welding gun GA. With reference to FIG. 5, in case the welding is sequentially performed from a welding position PO through a welding position P3, the teaching for welding operations in welding at a welding position P1 first, followed by welding at a welding position P2 by passing over an intermediate mountain portion MT is as follows.

Figure 6:
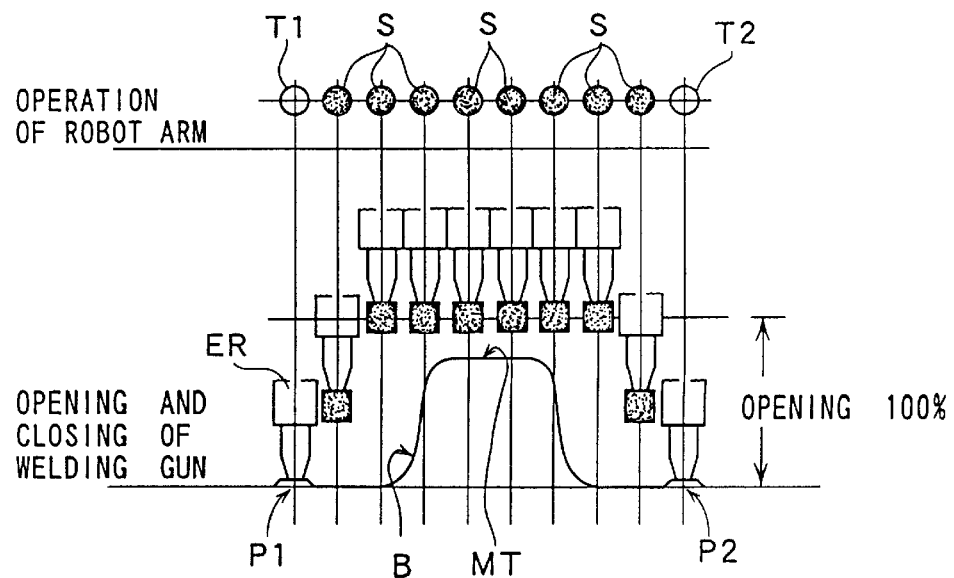
FIG. 6 is a diagram showing the relationship between the motion of a robot arm and the opening and closing motion of a welding gun.
Figure 7:
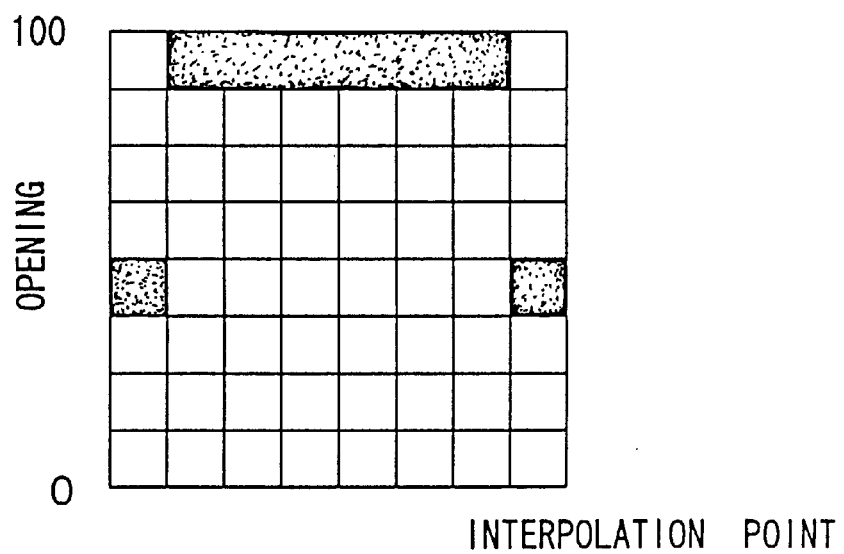
FIG. 7 is a diagram showing the opening and closing pattern in which the opening and closing is made at a high a speed and in which the opening becomes 100%.

With reference to FIG. 6, the welding positions P1, P2 are defined to be teaching points T1, T2, respectively, with regard to the robot arm RA. Once the teaching of both the teaching points T1, T2 has been finished, the control apparatus C sets a predetermined number of interpolating points S between both the teaching points T1, T2. According to this arrangement, the welding gun GA moves smoothly from the welding position P1 to the welding position P2 without being suddenly accelerated or decelerated. On the other hand, since there lies the mountain portion MT between the welding positions P1 and P2, it is necessary to open and close the welding gun GA while it moves from position P1 to position P2 so that the electrodes ER do not interfere with the mountain portion MT. Then, among the opening and closing patterns that are set in advance, the opening and closing pattern as shown in FIG. 7 is selected. This opening and closing pattern gives priority to the open time of the welding gun GA and its setting is made such that, once the welding at the welding position P1 has been finished, the welding gun GA is opened until the opening becomes 100%, this condition being maintained right before the welding position P2. The reason why the pattern as shown in FIG. 7 is selected in moving from the position P1 to the position P2 is that the mountain portion MT is present between the position P1 and the position P2, as described above. It follows that, since no mountain portion is present in moving from the position P0 to the position P1 and from the position P2 to the position P3 in FIG. 5, the pattern shown in FIG. 8 may be selected. The pattern shown in FIG. 8 is set such that the opening and closing speed is lower than the one shown in FIG. 7, and that the welding gun is not opened up to 100%.

Figure 9:
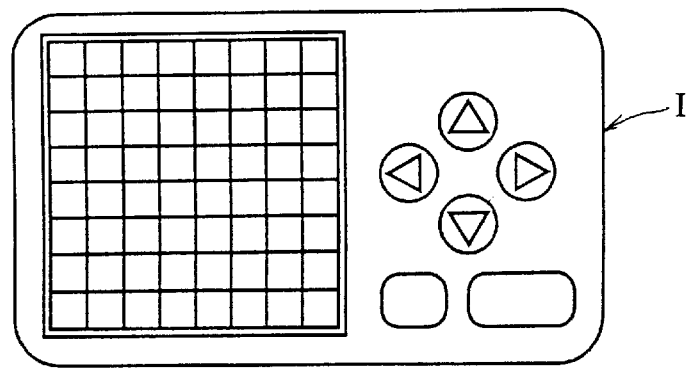
FIG. 9 is an outside view of a pattern setting portion which, in case a most appropriate one is not present among the opening and closing patters that have been set in advance, sets a new opening and closing pattern.

Several kinds of these opening and closing patterns are prepared in advance. However, depending on the shape of the vehicle body B, there are cases where a most appropriate opening and closing pattern is not found among those that have been prepared in advance. In such a case, a new opening and closing pattern is set by means of the control apparatus C or a pattern setting portion I which is provided in a teaching box shown in FIG. 9.

Figure 8:
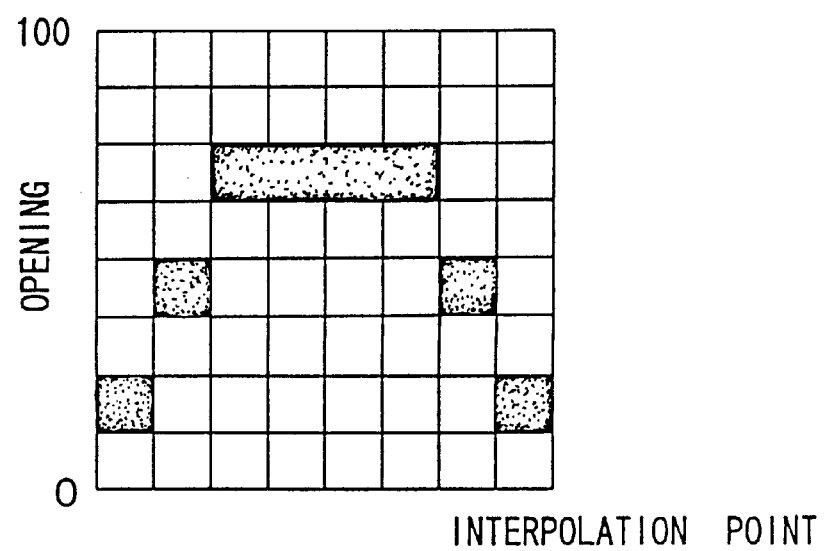
FIG. 8 is a diagram showing the opening and closing pattern in which the opening and closing is made at a low speed and in which the opening does not reach 100%.

In the above-described embodiment, there is shown an example in which eight interpolating points S are set between the teaching points T1, T2 with respect to the robot arm RA, and in which the opening and closing patterns shown in FIGS. 7 and 8 correspond to eight interpolating points. The number of interpolating points, however, depends on the number of interpolation in the movement of the robot arm, and varies with the distance between the welding positions, or the like. When the interpolating points increase or decrease, the opening and closing patterns may be set for each number of the interpolating points. It is, however, sufficient if the opening and closing patterns are used by correcting them depending on the increase or decrease in the number of interpolating points.

It is readily apparent that the above-described control apparatus for a welding robot and a method of teaching a welding robot meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a welding robot, comprising:
    a welding gun provided at a front end of a robot arm;
    a plurality of servomotors for driving said robot arm;
    an amplifier circuit board having mounted therein a plurality of inverters whose characteristics are adjustable to match respective kinds of said servomotors and an additional inverter for a transformer which provides welding electric current to said welding gun; and
    a memory for storing a servo software corresponding to each of said plurality of inverters, wherein the servo software is read out of said memory to drive said inverters and each of said inverters is determined to have characteristics appropriately matched to each of said servomotors and said transformer, respectively.

2. A control apparatus for a welding robot according to claim 1, wherein said robot arm is driven by five of said servomotors, and wherein two sets of said amplifier circuit boards of the same construction are used, one being for driving three servomotors and the other for driving two servomotors and for controlling electric current to said welding gun.

3. A control apparatus for a welding robot according to claim 1, wherein each of said inverters is provided with a setting portion for setting a code corresponding to each kind of said inverters, and wherein, when an inverter is mounted on said amplifier circuit board, the code in said setting portion is read out from said amplifier circuit board to thereby specify the kind of said inverter.

4. A control apparatus for a welding robot according to claim 3, wherein each of said inverters is provided with a DIP (dual inline package) switchpack, said code being set by said DIP switchpack.

5. A control apparatus for a welding robot according to claim 3, wherein data on capacity of each of said servomotors are held in each of said servomotors, and wherein said amplifier circuit board reads out said data from each of said servomotors via said inverters.

6. A control apparatus for a welding robot comprising a welding gun which is provided at a front end of a robot arm, characterized in that control of servomotors which drive said robot arm and control of welding electric current to be supplied to said welding gun are performed by a single amplifier.

7. A control apparatus for a welding robot according to claim 6, wherein said amplifier includes a plurality of inverters and wherein at least one of said plurality of inverters is used for controlling welding electric current.

8. A control apparatus for a welding robot according to claim 7, wherein said robot arm is driven by five of said servomotors, and wherein two sets of circuit boards of said amplifier of the same construction are used, one being for driving three servomotors and the other for driving two servomotors and for controlling the electric current to said welding gun.

9. A control apparatus for a welding robot according to claim 7, wherein said amplifier is provided with a sampling function for sampling welding electric current and electric motor current, wherein a sampling period of said electric motor current is a value which is obtained by dividing a sampling period of said welding electric current by an integer and which falls within a range of predetermined sampling periods to be defined by characteristics of said servomotors and a processing capacity of said control apparatus.

10. A control apparatus for a welding robot according to claim 9, wherein said integer is an integral multiple of 2.

11. A control apparatus for a welding robot according to claim 6, wherein said amplifier is provided with a sampling function for sampling welding electric current and electric motor current, wherein a sampling period of said electric motor current is a value which is obtained by dividing a sampling period of said welding electric current by an integer and which falls within a range of predetermined sampling periods to be defined by characteristics of said servomotors and a processing capacity of said control apparatus.

12. A control apparatus for a welding robot according to claim 11, wherein said integer is an integral multiple of 2.

13. A method of teaching a welding robot comprising a welding gun mounted on a robot arm, said welding gun being opened and closed by a servomotor, said method comprising:

setting in advance plural kinds of opening and closing patterns of the welding gun; and selecting an appropriate opening and closing pattern out of said plural kinds of opening and closing patterns in accordance with the motion of said robot arm to determine a selected pattern to be used as teaching data relating to the opening and closing of the welding gun.

14. A method of teaching a welding robot according to claim 13, further comprising the step of newly setting, during the determination of the selected pattern as teaching data, an opening and closing pattern by using a teaching box in case a most appropriate opening and closing pattern is not found in the opening and closing patterns that have been set in advance.

15. A method of teaching a welding robot according to claim 14, further comprising the steps of setting at least one interpolating point between two welding positions defined as teaching points to be set in teaching the motion of said robot arm, and correcting said opening and closing pattern depending on an increase or decrease in the number of said interpolating points.

* * * * *